(12) United States Patent
Forhan

(10) Patent No.: US 9,783,016 B2
(45) Date of Patent: Oct. 10, 2017

(54) ADJUSTABLE BRACKET FOR STORAGE OF TRAILER HITCH BALL MOUNT

(71) Applicant: Greg Thomas Forhan, Green Cove Springs, FL (US)

(72) Inventor: Greg Thomas Forhan, Green Cove Springs, FL (US)

( * ) Notice: Subject to any disclaimer, the term of this patent is extended or adjusted under 35 U.S.C. 154(b) by 153 days.

(21) Appl. No.: 14/857,857

(22) Filed: Sep. 18, 2015

(65) Prior Publication Data

US 2017/0080873 A1 Mar. 23, 2017

(51) Int. Cl.
| | | |
|---|---|---|
| *B60D 1/52* | (2006.01) | |
| *B60D 1/58* | (2006.01) | |
| *B60R 11/00* | (2006.01) | |
| *B60R 11/06* | (2006.01) | |
| *B60D 1/06* | (2006.01) | |

(52) U.S. Cl.
CPC ............... *B60D 1/58* (2013.01); *B60R 11/06* (2013.01); *B60D 1/06* (2013.01); *B60D 1/52* (2013.01); *B60R 11/00* (2013.01); *B60R 2011/004* (2013.01); *B60R 2011/0052* (2013.01)

(58) Field of Classification Search
CPC ... B60R 11/00; B60R 11/06; B60R 2011/004; B60R 2011/0052; B60D 1/52; B60D 1/58; B60D 1/06
USPC .......................................... 224/519; D12/162
See application file for complete search history.

(56) References Cited

U.S. PATENT DOCUMENTS

| | | | |
|---|---|---|---|
| 2,544,185 A | 3/1951 | Sargent | |
| 2,737,399 A | 3/1956 | Halverson | |
| 2,838,327 A | 6/1958 | Collins | |
| 2,856,204 A | 10/1958 | Graham | |
| 2,914,343 A | 11/1959 | Roth | |
| 3,117,805 A | 1/1964 | Schoeffler | |
| 5,476,279 A | 12/1995 | Klemetsen | |
| 6,125,945 A | 10/2000 | Skaggs et al. | |
| 6,149,181 A | 11/2000 | Biederman | |
| 6,234,512 B1 | 5/2001 | Bettenhausen | |
| 6,474,522 B1 * | 11/2002 | Johnson | B60R 9/06 224/514 |
| 6,527,292 B2 | 3/2003 | Adair | |
| 6,712,381 B1 | 3/2004 | Moss | |

(Continued)

OTHER PUBLICATIONS

Tow & Stow™ Adjustable Ball Mounts B&W Trailer Hitches product information, [online webpage, retrieved Jun. 24, 2015] from: http://turnoverball.com/products/adjustableballmounts/tow-stow-receiver-hitch, pp. 1-4.

(Continued)

*Primary Examiner* — Justin Larson
(74) *Attorney, Agent, or Firm* — Saliwanchik, Lloyd & Eisenschenk

(57) ABSTRACT

The problem of storing a ball mount when not engaged in a receiver hitch opening is solved by a ball mount storage bracket. A ball mount storage bracket can attach around the neck of a receiver hitch and be oriented towards or away from the vehicle. The shank of the ball mount can be seated in the storage bracket and secured with the same pin and bolt that holds the ball mount in the receiver hitch. The storage bracket can be secured with a single U-bolt or similar type of connector, which makes it useful even if the rest of the receiver hitch is inaccessible.

24 Claims, 12 Drawing Sheets

(56) References Cited

U.S. PATENT DOCUMENTS

| | | | | |
|---|---|---|---|---|
| 6,832,709 | B2* | 12/2004 | Henry | B60D 1/06 224/403 |
| 6,974,148 | B2 | 12/2005 | Moss et al. | |
| 7,029,022 | B2 | 4/2006 | Moss | |
| 7,055,844 | B1 | 6/2006 | Bostedt | |
| 7,258,359 | B2 | 8/2007 | Wooten | |
| 7,338,064 | B1 | 3/2008 | Williams | |
| 7,815,211 | B2 | 10/2010 | Witchey | |
| 8,079,611 | B2 | 12/2011 | Schroeder | |
| 8,231,035 | B1 | 7/2012 | Michael et al. | |
| 8,408,577 | B2 | 4/2013 | Works | |
| 8,469,429 | B1 | 6/2013 | Spronk | |
| D688,168 | S | 8/2013 | Buschman | |
| 8,893,939 | B2* | 11/2014 | Brass | B60D 1/60 224/515 |
| 9,511,721 | B1* | 12/2016 | Hawkins | B60R 11/06 |
| 2006/0220347 | A1 | 10/2006 | Witchey | |
| 2006/0289580 | A1* | 12/2006 | Faver | B60D 1/06 224/521 |
| 2008/0224448 | A1* | 9/2008 | Siemantel | B60D 1/52 280/507 |
| 2008/0264991 | A1* | 10/2008 | Foster | B60R 9/06 224/519 |
| 2010/0314899 | A1* | 12/2010 | Slacks | B60R 11/06 296/37.6 |
| 2011/0156369 | A1* | 6/2011 | Schroder | B60D 1/06 280/491.1 |
| 2012/0049484 | A1* | 3/2012 | Brass | B60D 1/60 280/507 |
| 2016/0001711 | A1* | 1/2016 | Hughes | B60R 9/06 224/403 |
| 2016/0303934 | A1* | 10/2016 | Olson | B60D 1/58 |
| 2017/0158147 | A1* | 6/2017 | Harrison | B60R 11/06 |

OTHER PUBLICATIONS

ASFIR4X4 Products Detachable Tow Bar for ASFIR4X4 Bumper for Jeep 07-12 Wranger JK & Wrangler Unlimited, American Four Wheeler product information, [online webpage, retrieved Jun. 24, 2015] from: http:www.americanfourwheeler.com/ASFIR4X4-Products-Detachable-Tow-Bar-For-ASFIR4X4-Bumper-for-Jeep-07-10-Wrangler-JK.html, pp. 1-4.

Types of Tow Bars: Motorhome Mounted, Blue Ox Towing product information, [online webpage, retrieved Jun. 24, 2015] from: http:www.blueoxtow.com, pp. 1-3.

Reese Hide a Gooseneck Hitch, Auto Accessories Garage product information, [online webpage, retrieved Jun. 24, 2015] from: http://www.autoaccessoriesgarage.com/Towing-Hitches/Reese-Hide-A-Goose-Gooseneck-Hitch, pp. 1-2.

* cited by examiner

ADJUSTABLE BRACKET FOR STORAGE OF TRAILER HITCH BALL MOUNT

BACKGROUND OF INVENTION

Trailer hitches are devices that attach to the chassis of a vehicle and are used for towing. The most common type of trailer hitch is the "bumper pull" trailer hitch, which is designed for towing from the rear of a vehicle. A typical bumper pull trailer hitch has two components. The first component is a rigid "receiver" of steel or other metal or rigid material that can be securely attached, usually with bolts, to the frame of the towing vehicle. The receiver has a receiver neck directed away from the rear of the vehicle. The second component is a ball mount, which is a rigid piece that has a tow ball mounted on one end and a shank at the other end that slides into and is secured within a receiver opening in the receiver neck. The towed object will have a tongue that fits over the tow ball, securing the towed object to the vehicle and allowing rotation between the vehicle and the towed object. There are several sizes of tow balls that can be mounted onto the ball mount. There are different diameters of tow balls used depending on what is being towed. A tow ball can be replaced or swapped if another size is needed to fit the tongue of the towed object. But, typically, the entire ball mount is switched out, which is easier than removing just the ball.

When the ball mount shank is within the receiver opening, the ball mount necessarily projects outward from the rear of the vehicle, so that the object to be towed can be attached to the ball and have a sufficient turn radius. When not in use, the projecting ball mount can present problems with parking, backing, and maneuvering around the rear of the vehicle. The ball mount can be removed when not in use, but can be awkward to store in the vehicle. There are storage devices available for storing a ball mount removed from the receiver opening. Some of these storage devices can be used to attach the ball mount to another area of the vehicle, such as in the bed of a truck. This often creates an obstruction in another area of the vehicle. Other storage devices operate by fitting into the receiver opening in the receiver neck and storing the ball mount sideways near the undercarriage of the vehicle. However, when the ball mount must actually be used in the receiver opening, the storage device that held the ball mount then has to be stored somewhere else. Other devices fit onto the arms or supports that hold the receiver to the vehicle. However, factory installed trailer receivers often have the receiver supports built-in or covered by the undercarriage components of the vehicle and are inaccessible. Storage devices designed to attach to these other sections of the trailer receiver are often not conducive to attachment around the accessible portion of the receiver neck, as there is usually insufficient surface area on the neck to support the storage devices.

There has yet to be a ball mount storage device that secures a ball mount unobtrusively on a vehicle, does not interfere with use of the ball mount, does not itself have to be stored when not used to secure the ball mount, does not obstruct other usable areas of the vehicle, and that can be attached and adequately secured to the receiver neck.

BRIEF SUMMARY

In accordance with the embodiments of the subject invention, the problem of storing a trailer hitch ball mount is solved by a "ball mount storage bracket" or "storage bracket" that can be attached to the receiver neck of a receiver hitch and can hold the ball mount against or near to the vehicle. Advantageously, the storage bracket does not utilize the receiver opening, can be attached regardless of the length of the receiver neck, and can remain on the receiver hitch when the ball mount is removed and in use. In this way, the ball mount can be conveniently stored and can also be easily disconnected from the storage bracket and placed within the receiver opening when necessary. A further advantage is the ability to attach the storage bracket above, below, or to the side of the receiving opening to accommodate a variety of vehicle styles.

Thus, the storage bracket embodiments of the subject invention successfully address the above described disadvantages associated with the previously known devices and methods, and provide certain attributes and advantages, which have not been realized by these known devices. They are also easy to install on a trailer hitch receiver neck and can remain in place on a receiver hitch when the ball mount is in use. Certain embodiments also allow attachment of more than one ball mount to a storage bracket, such that ball mounts with different size tow balls can be conveniently stored on a vehicle. While the embodiments of the subject invention are particularly useful when the receiver neck is the only accessible part of the trailer hitch, they can be used on any part of a trailer hitch receiver, and, thus, are not limited to just attachment to the receiver neck.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein might not be drawn to scale, and any reference to dimensions in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which.

DETAILED DISCLOSURE

Figure 1:
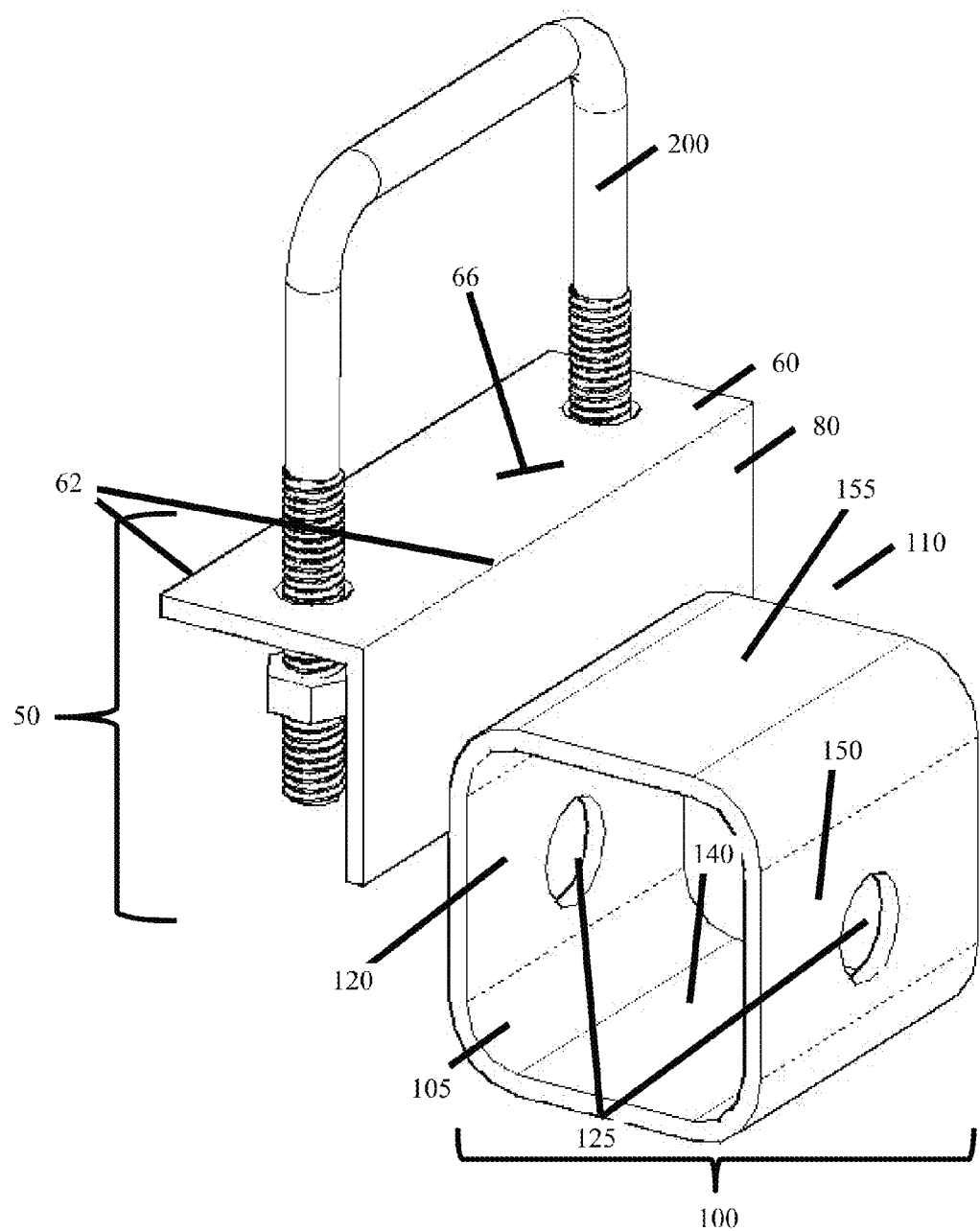
FIG. 1 is a front left isometric view of a first embodiment of the subject invention utilizing a closed seat seating assembly attached to the hanger assembly.

The subject invention describes embodiments of ball mount storage brackets that can be attached to a receiver hitch. More specifically, the subject invention provides one or more embodiment(s) of a ball mount storage bracket, or similar device, capable of being attached to a receiver neck on a receiver hitch without utilizing the receiver opening and can store the ball mount in a safe and convenient location at or near to the vehicle undercarriage. The storage bracket embodiments allow the ball mount to be removed from the receiver opening and stored on the vehicle so that it does not project from the rear of the vehicle or take up space in other areas of the vehicle, i.e., the cab, bed, or storage enclosures.

The following description will disclose that the subject invention is particularly useful on vehicles used for towing, in particular, vehicles having an attached receiver hitch for receiving a ball mount. However, a person with skill in the art will be able to recognize numerous other uses that would be applicable to the devices and methods of the subject invention. While the subject application describes, and many of the terms herein relate to, a use for storage of a ball mount disconnected from a receiver hitch, modification for other uses apparent to a person with skill in the art and having benefit of the subject disclosure are contemplated to be within the scope of the present invention.

In the description that follows, reference is made to the "proximal end" and "distal end." As used herein, the proximal end is that end nearest to the receiver hitch when a storage bracket is attached to a receiver hitch. Conversely, the distal end of the device is that end furthest from the receiver hitch when the bracket is attached to a receiver hitch.

The present invention is more particularly described in the following examples that are intended to be illustrative only, since numerous modifications and variations therein will be apparent to those skilled in the art. As used in the specification and in the claims, the singular for "a," "an," and "the" include plural referents unless the context clearly dictates otherwise.

Reference will be made to the attached figures on which the same reference numerals are used throughout to indicate the same or similar components. With reference to the attached figures, which show certain embodiments of the subject invention, it can be seen that a storage bracket 10 embodiment of the subject invention for securing a ball mount 5 to a receiver hitch 7 includes a hanger assembly 50 towards the proximal end 2 with at least a stabilizer plate 60 and a supporting plate 80 and a seating assembly 100 attached to the distal end 3 of the hanger assembly, where the seating assembly has at least a seat wall 120 and a seat 140 against which a ball mount 5 can be secured. One or more pin receiver holes 125 in the seating assembly can be used to secure the ball mount to the seating assembly and a single connector 200 can be used to removably attach the storage bracket by the hanger assembly to a receiver hitch, particularly to the receiver neck on a receiver hitch. Alternatively, the storage bracket can be permanently attached to the receiver neck. Each of these general components can have one or more sub-components, which will be discussed in detail below.

The components of the subject invention can be rigid or at least semi-rigid, so as to provide sufficient support for a ball mount and so that they can maintain their position on a receiver hitch. Typically, such devices comprise one or more rigid metals, such as steel, iron, aluminum, or combinations of these or other metals. It is contemplated that the embodiments of the subject invention can also be manufactured from any of a variety of suitable metals. This does not preclude the use of one or more alternative materials such as plastics, ceramics, wood, or any other material suitable for the embodiments of the subject invention. It is within the skill of a person trained in the art and having benefit of this disclosure to determine which material(s) can be suitable for manufacture of the embodiments of the subject invention. Therefore, such variations will not be discussed further herein. However, it will be understood that any and all such variations that provide the same functions, in substantially the same way, with substantially the same result are within the scope of this invention.

A hanger assembly 50 is, generally, those components of a storage bracket 10 that connect a seating assembly 100 to a receiver hitch 7. More particularly, a hanger assembly is that portion of a storage bracket configured to connect a seating assembly to a hitch receiver neck 8, without utilizing or interfering with the utilization of the receiver hitch opening 9. The embodiments of the subject invention are unique in that the hanger assembly allows attachment of the storage bracket in any direction around a receiver neck, including, above, below, or on either side of the receiver neck. The hanger assembly also allows the seating assembly to be turned in two directions, such that it can face towards or away from the vehicle. This flexibility in positioning allows a storage bracket of the subject invention to be used on a variety of vehicles and to accommodate any type of ball mount, including, but not limited to, step-down ball mounts.

In one embodiment, a hanger assembly has a stabilizer plate 60 and a supporting plate 80 that extends from the stabilizer plate. The stabilizer plate can contact the hitch receiver and provides the support bracket with stability when secured adjacent to the receiver hitch surface with a connector. The supporting plate can connect the stabilizer plate with the seating assembly 100. The stabilizer plate and supporting plate can be permanently or removably connected to each other by any device or method known to those with skill in the art. In one embodiment, the two plates are welded together so as to be inseparable. However, the two plates can also be separably connected with any of a variety of bolts, screws, pins, clamps, or other types of connecting devices, as known to those with skill in the art. Such variations are within the scope of this invention.

Figure 6:
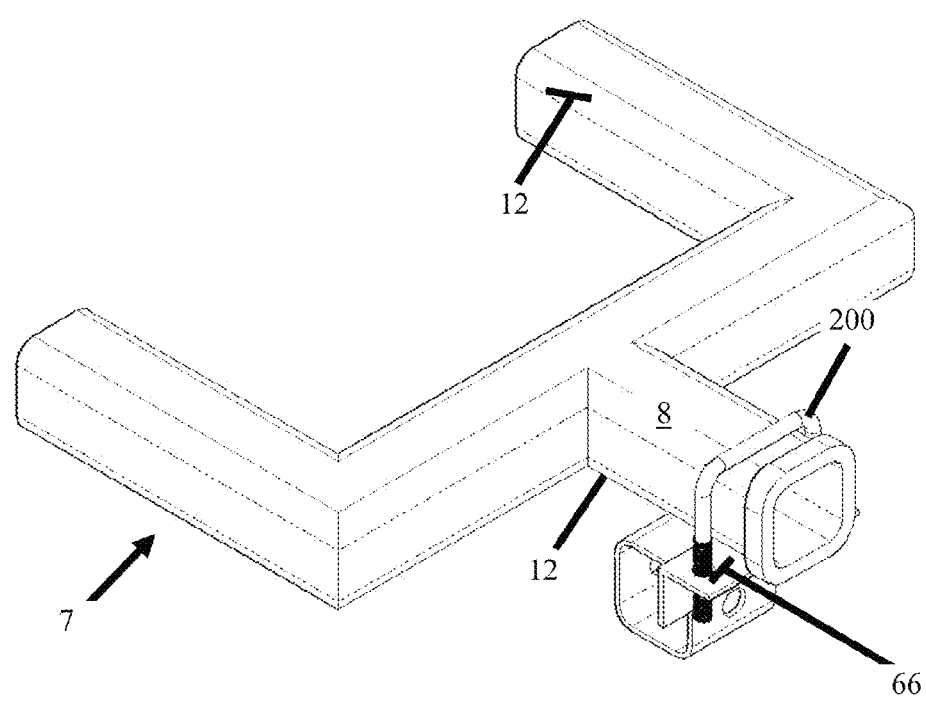
FIG. 6 a top left isometric view of a first embodiment of the subject invention utilizing a closed seat seating assembly attached to the hanger assembly and shown attached to a receiver neck of a receiver hitch. In this view, the seating assembly is directed opposite to the receiver opening.
Figure 7:
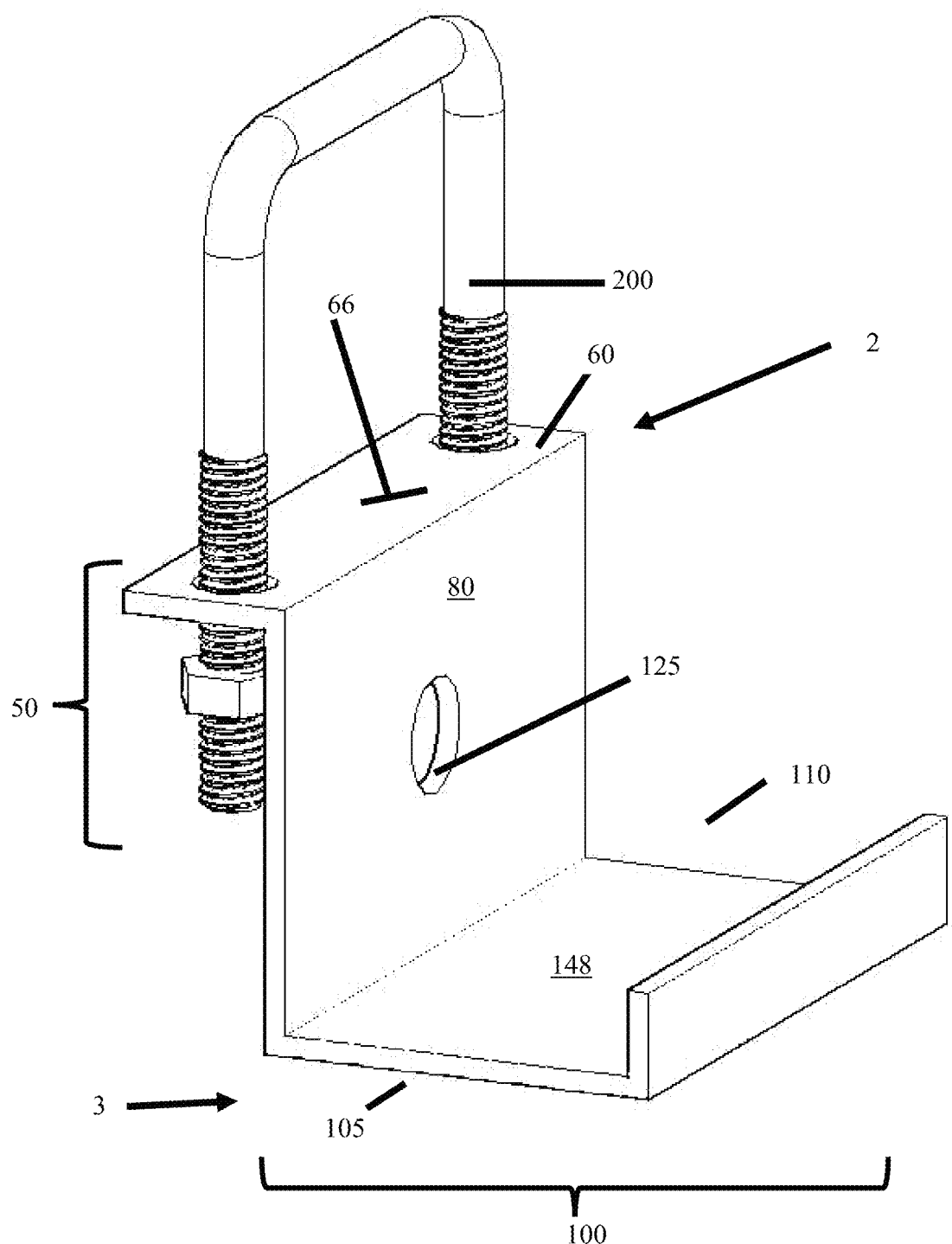
FIG. 7 is a front left isometric view of a second embodiment of the subject invention utilizing an open seat seating assembly attached to the hanger assembly.
Figure 8:
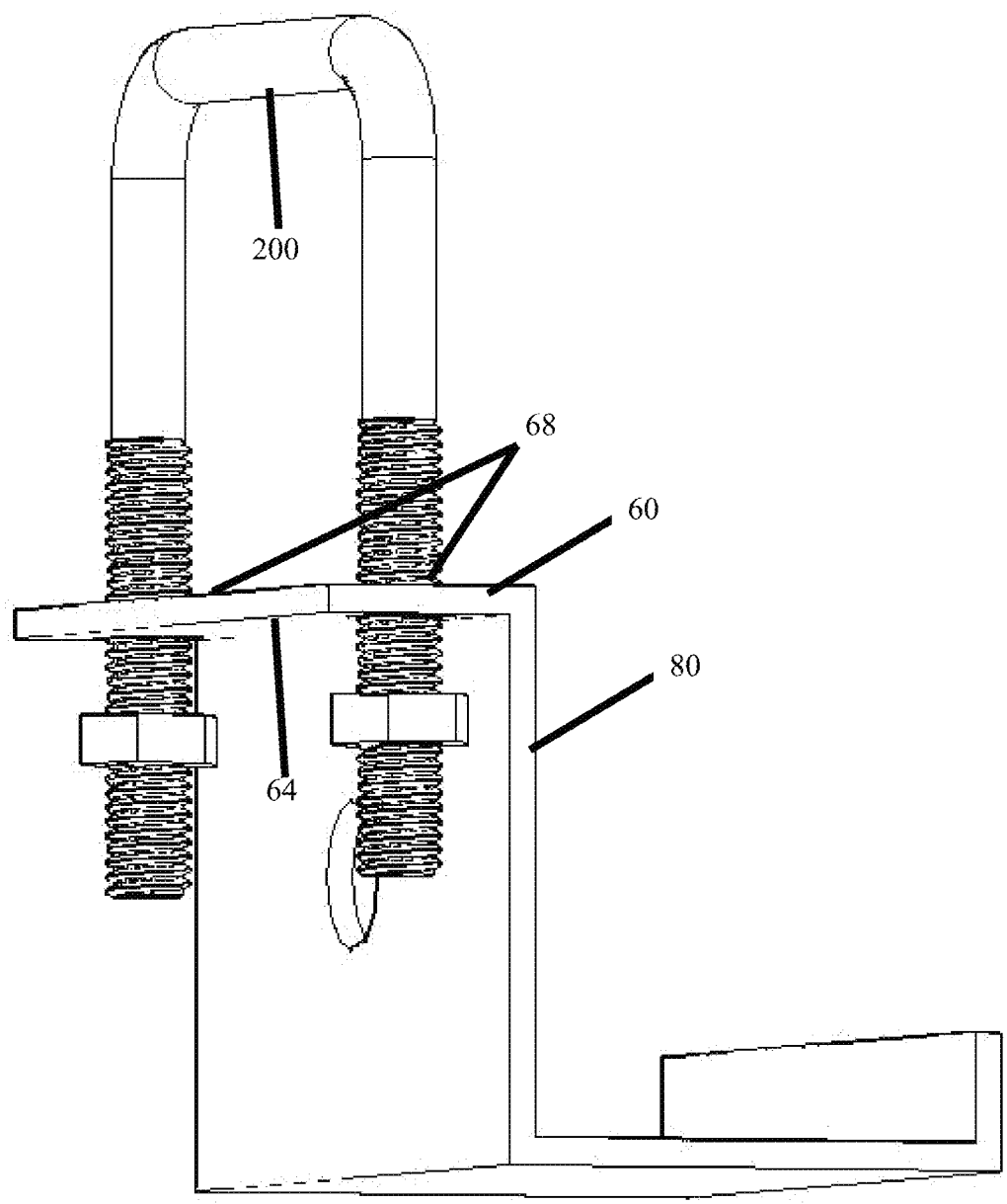
FIG. 8 rear left isometric view of the second embodiment in FIG. 7.
Figure 12:
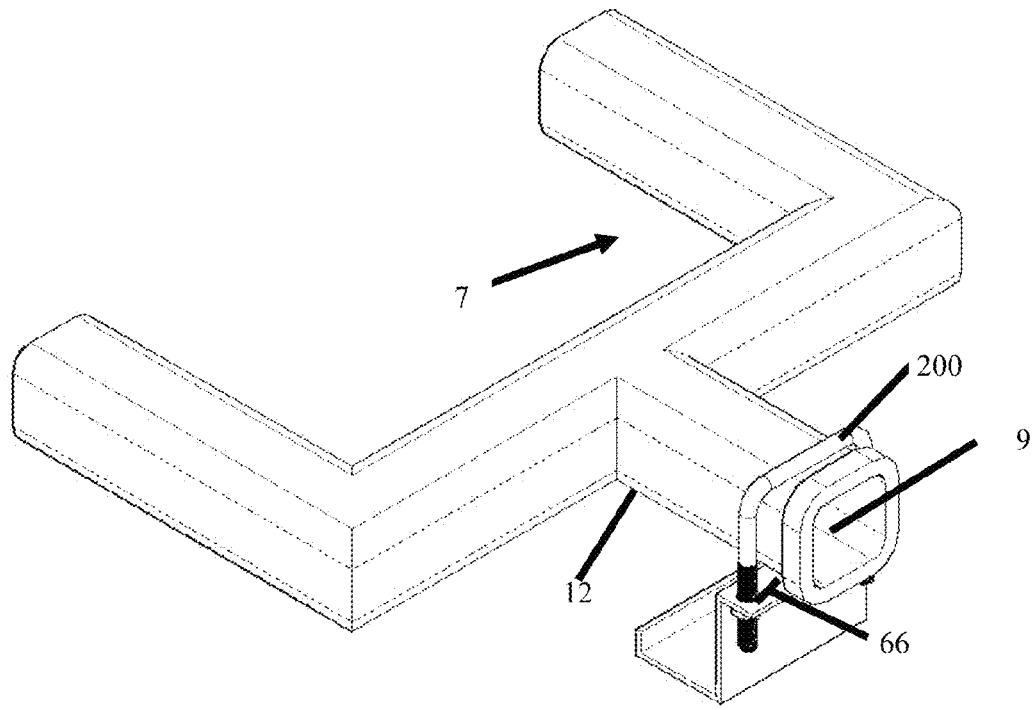
FIG. 12 a top left isometric view of a second embodiment of the subject invention utilizing an open seat seating assembly attached to the hanger assembly and shown attached to a receiver neck of a receiver hitch. In this view, the seating assembly is directed opposite to the receiver opening.

Attachment of a hanger assembly to a receiver hitch can be facilitated by the stabilizer plate. A stabilizer plate can have at least lateral edges 62, as well as an undersurface 64 and a stabilizing surface 66 on opposite sides of the stabilizer plate, as shown, for example, in FIGS. 1, 3, 4, 8, and 10. A stabilizing surface can be configured to make sufficient contact with a surface 12 on a hitch receiver, as shown in FIGS. 6 and 12. The stabilizing surface can have any of a variety of circumferential shapes, but will, ideally, have a sufficient surface area that, when secured firmly against a surface 12 of the receiver hitch, inhibits undesirable movement such as rocking, twisting, and rotating, or combinations thereof, of the storage bracket relative to the receiver hitch. There can also be various features on the surface that enhance or increase the contact between the stabilizing surface and the receiver hitch.

Likewise, receiver hitches can have various surface features or shapes, from rounded to squared, or combinations thereof. Receiver hitches are notoriously variable in shape, size, and diameter of the components that are used for attachment to a vehicle. However, ball mounts 5 are often interchangeable between receiver hitches and, as such, are generally standardized, usually having a square shank 6 that slides into the receiver hitch opening 9. Receiver hitch necks also tend to be generally standardized in the industry having a shape, size, and configuration that is similar amongst receiver hitches to accommodate different ball mounts. In general, receiver hitch necks can have at least one planar surface 15. In one embodiment, the stabilizing surface is generally planar so as to maximize contact with the planar surface area of a receiver hitch, preferably a planar surface area around the receiver hitch neck. In another embodiment, the stabilizing surface has one or more curves or angles that can be compatible with one or more surfaces on the receiver hitch or receiver hitch neck, so as to maximize contact.

Figure 2:
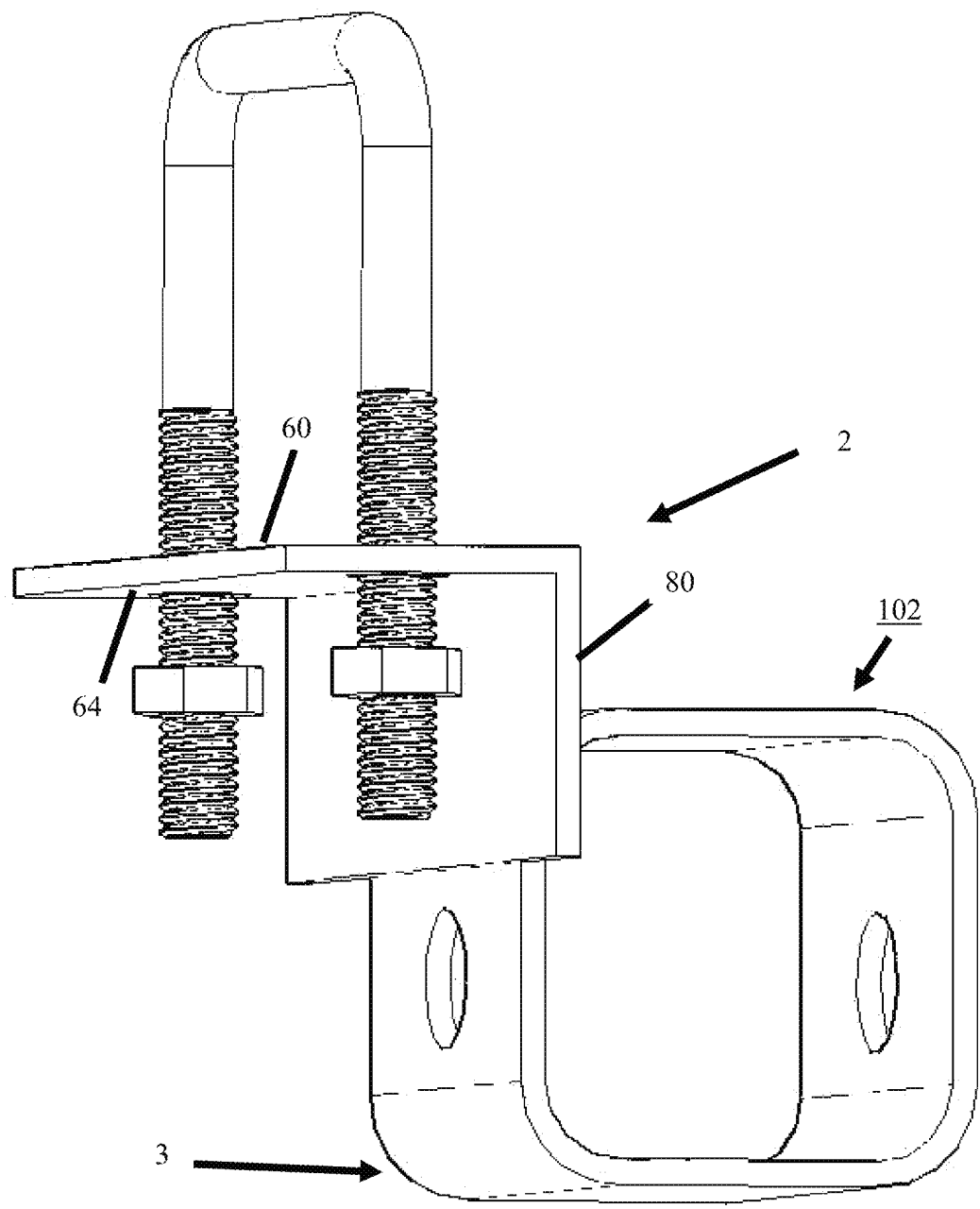
FIG. 2 rear left isometric view of the first embodiment in FIG. 1.

The undersurface 64 of a stabilizer plate 60 can be on the side opposite to the stabilizing surface. In certain embodiments, the undersurface is that surface against which a connector 200 can be secured to the storage bracket, as shown, for example, in FIGS. 2 and 8. The undersurface can have any of a variety of surface features or structures to support or aid in the attachment of the connector. In one embodiment, the undersurface is symmetrical or substantially symmetrical with the stabilizing surface. In an alternative embodiment, the undersurface is asymmetrical with the stabilizing surface. In another alternative embodiment, the undersurface and stabilizing surface are congruent surfaces. FIG. 4B illustrates, with dashed lines, non-limiting embodiments of all of these examples.

As mentioned above, it is the stabilizer plate 60 component of a storage bracket 10 that is employed to make contact with a receiver hitch, particularly a receiver hitch neck 8. The stabilizer plate can have fixation structures 68 thereon to aid in such attachment. For example, there can be one or more connector holes, connector hooks, connector eyelets, connector stays, and other types of structures to which various types of connectors 200 can be removably attached, as shown, for example, in FIGS. 4 and 10. The use of a stabilizer plate with the embodiments of the subject invention provides the unique advantage of not having to employ the connector to actually stabilize or inhibit movement of the storage bracket on the receiver hitch. The connector can be used to draw or tighten the stabilizing surface against the receiver hitch surface 12. It is this cooperation between the juxtaposed receiver hitch and the stabilizer plate that inhibits undesirable motion of the stabilizer bracket. It also allows the connector 200 to be smaller, narrower, or have a smaller footprint, such that it does not require access to a significant surface area on the receiver hitch to operate.

In one embodiment, a connector 200 is a band, rod, or belt of rugged, sturdy, rigid, and/or tough material with two or more ends that can go over a receiver hitch, such as the receiver hitch neck, and so that the ends can be removeably attached to a fixation structure on the stabilizer plate and on either side of the receiver hitch. In a specific embodiment, a connector is a rigid metal U-bolt with two threaded ends and the fixation structures are holes through the stabilizer plate in which the threaded ends can pass and be secured with nuts against the under surface 64. One non-limiting example of this is shown in FIGS. 5, 6, 11, and 12. As shown in FIGS. 5, 6, 11, and 12, a single U-bolt attached to the stabilizer plate can securely attach and inhibit movement of the storage bracket.

Figure 4A:
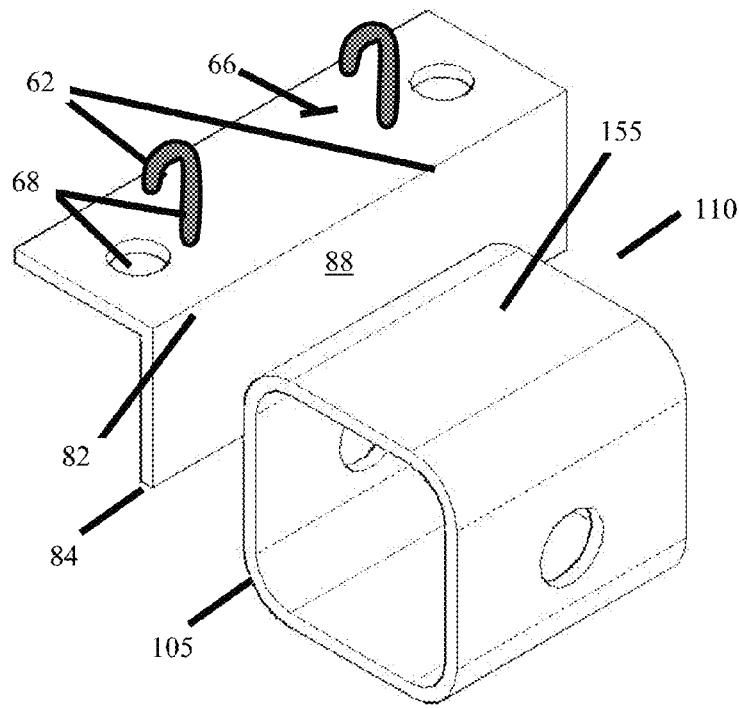
FIG. 4A is a top left isometric view of the first embodiment in FIG. 1, without alternative connectors.
Figure 4B:
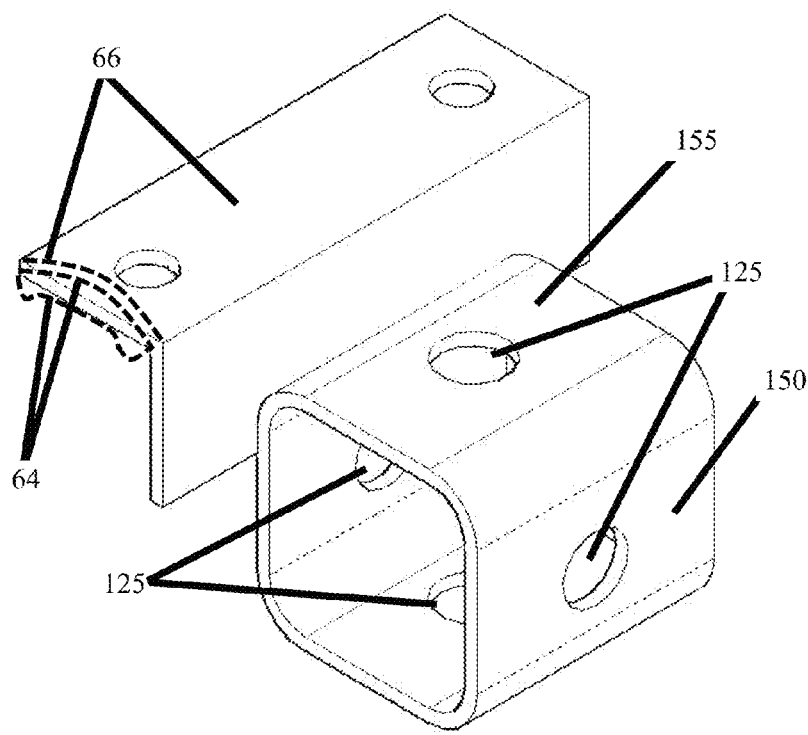
FIG. 4B is a top left isometric view of the first embodiment in FIG. 1, with pin receiver eye in each surface of the seating assembly.
Figure 5:
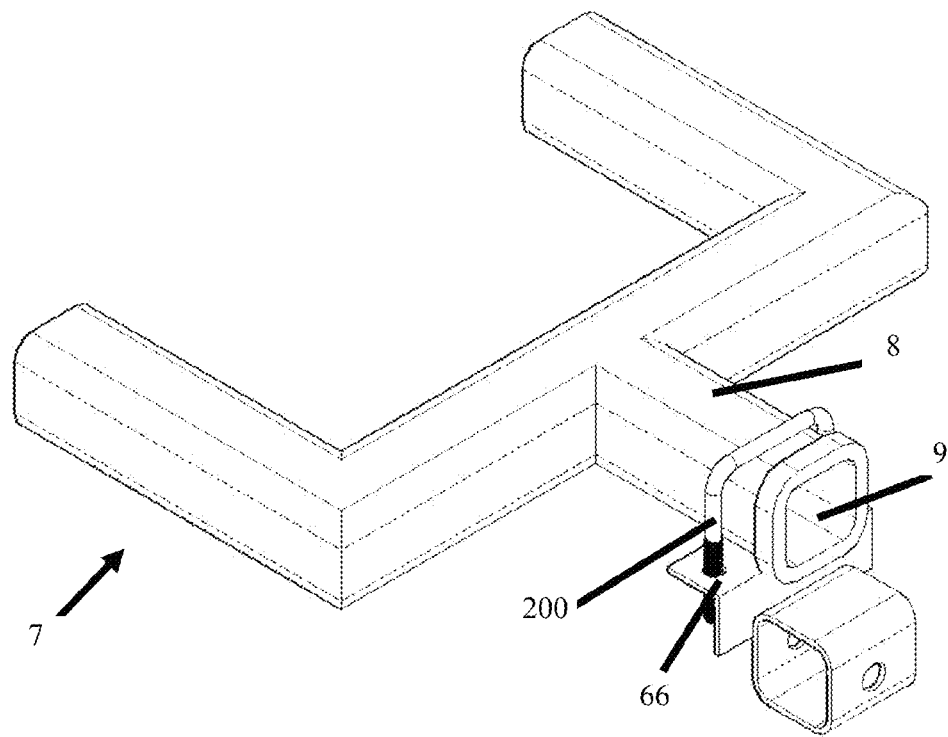
FIG. 5 is a top left isometric view of a first embodiment of the subject invention utilizing a closed seat seating assembly attached to the hanger assembly and shown attached to a receiver neck of a receiver hitch. In this view, the seating assembly is directed towards the receiver opening.
Figure 10:
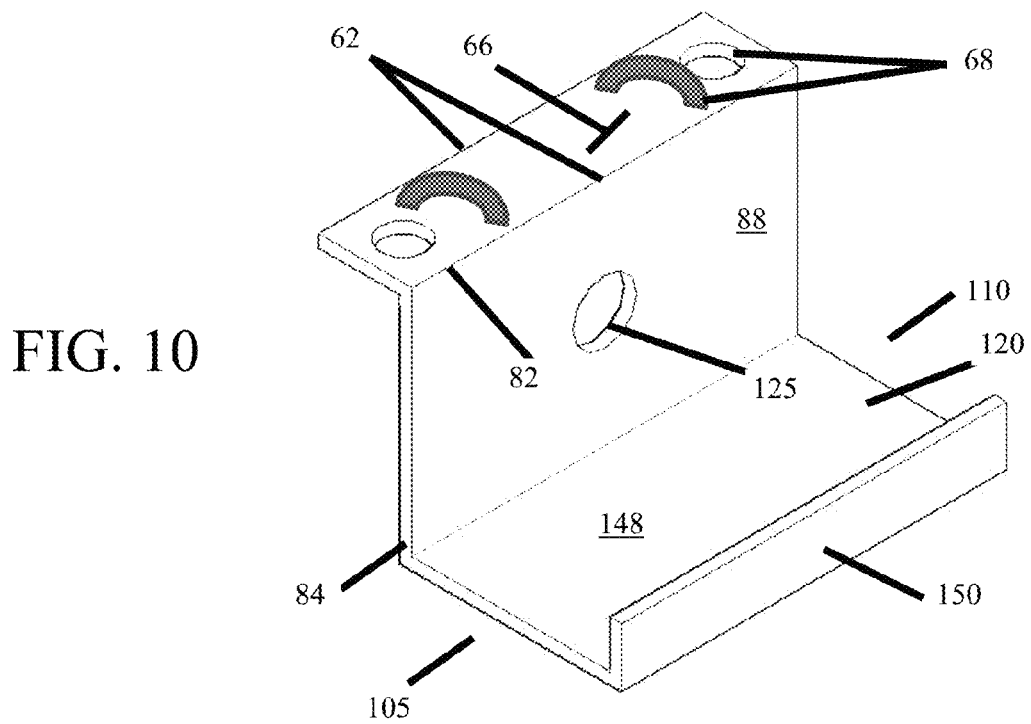
FIG. 10 is a top left isometric view of the second embodiment in FIG. 7, without an alternative connector.
Figure 11:
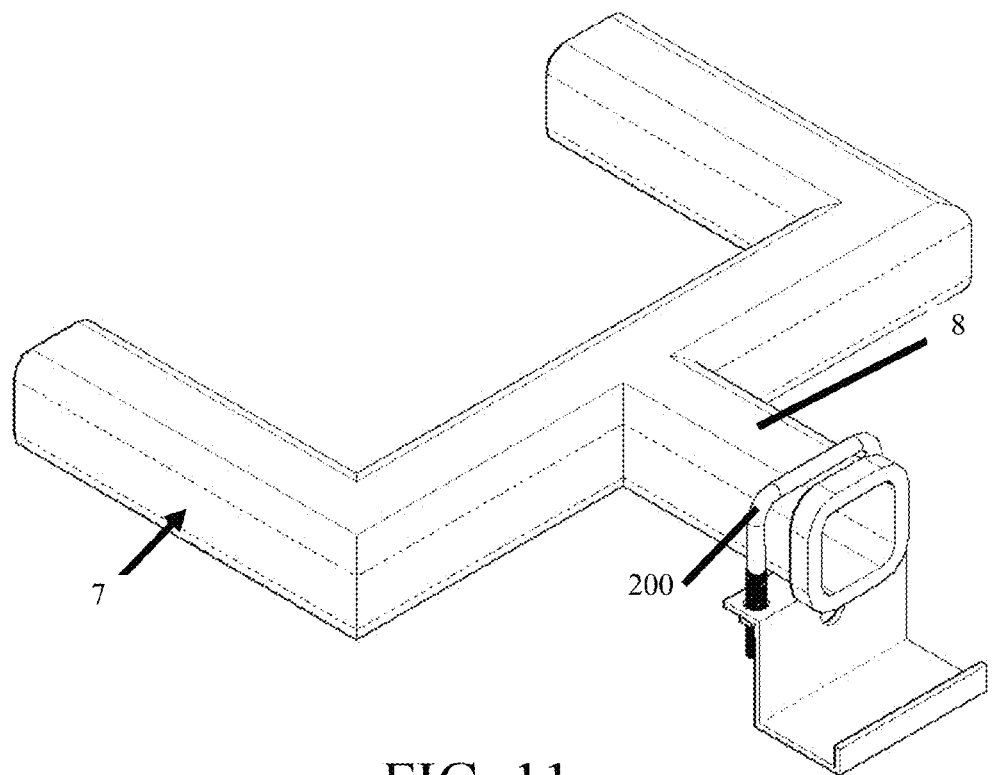
FIG. 11 is a top left isometric view of a second embodiment of the subject invention utilizing an open seat seating assembly attached to the hanger assembly and shown attached to a receiver neck of a receiver hitch. In this view, the seating assembly is directed towards the receiver opening.

The overall width of a stabilizer plate, between the lateral edges 62, as shown in FIGS. 4A and 10, can vary depending upon the shape of the stabilizer plate, type of connector, the type of fixation structures, and other factors understood by those with skill in the art. Ideally, the width will be only that required to adequately contact the receiver hitch neck to inhibit movement of the storage bracket. In one embodiment, the width of a stabilizer plate is between approximately 0.5 inch and 2.5 inch. In a more particular embodiment, the width of a stabilizer plate is between approximately 0.75 inch and 2.0 inch. In a specific embodiment, the width of a stabilizer plate is approximately 1.5 inch. A person with skill in the art will be able to determine an appropriate width for a stabilizer plate. Such variations are within the scope of the subject invention.

A supporting plate 80 can be attached to a stabilizer plate and extend away from the under surface 64 side of the supporting plate. A supporting plate can be attached anywhere along the undersurface 64 or lateral edges 62 of a stabilizing plate. FIGS. 4A and 10 illustrate embodiments of a support bracket 10 having a supporting plate with an upper edge 82, a lower edge 84, and a facing surface 88. In one embodiment, the upper edge attaches to a point on the undersurface of the stabilizer plate. In a more specific embodiment, the upper edge is attached to at or about a lateral edge 62 of the stabilizer plate, as shown, by way of example, in FIGS. 3A, 3B, and 9.

The supporting plate, being attached to the stabilizer plate 60, as described above, can extend away from the undersurface 64 of the stabilizer plate. It can extend away at any angle, relative to the stabilizer plate, as long as the shank 6 of a ball mount can be placed there against. In one embodiment, the supporting plate and stabilizer plate are substantially perpendicular, as shown, for example, in FIGS. 3 and 9. Alternatively, the stabilizer plate and supporting plate are not perpendicular. The length of a supporting plate, between the upper edge 82 and the lower edge 84 can vary, but can be long enough to accommodate the placement of a ball mount on the seating assembly. A person with skill in the art, having benefit of the subject disclosure, can determine an appropriate length for a supporting plate. Such variations are within the scope of the subject invention.

The seating assembly 100 is that portion of the storage bracket 10 in which a ball mount can be seated and secured. The seating assembly can be attached at or about the lower edge 84 or distal end 3 of the support plate. FIGS. 1-6 illustrate an embodiment where one type of seating assembly is attached to the support plate. In these figures it is shown attached to the distal end of the facing surface 88, but it could be attached elsewhere on the support plate. Alternatively, the support plate can be contiguous with or integrated with the seating assembly, such that the support plate and some part of the seating assembly are substantially a single unit piece. FIGS. 7-12 illustrate examples of this embodiment, where the support plate and a seat wall on the seating assembly are joined end-to-end, to form a single unit.

Figure 13:
FIG. 13 is photographs of non-limiting examples of ball mount styles that can be utilized with the embodiments of the subject invention.
Figure 14:
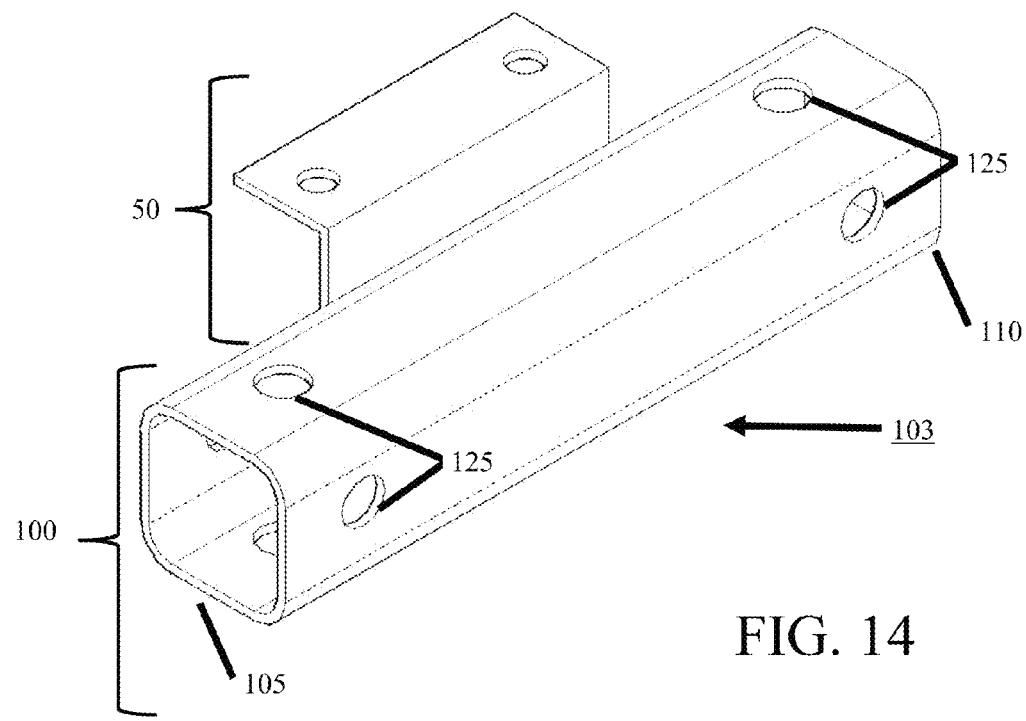
FIG. 14 is a front left isometric view of an embodiment of a dual configuration seating assembly, shown without a connector.
Figure 15:
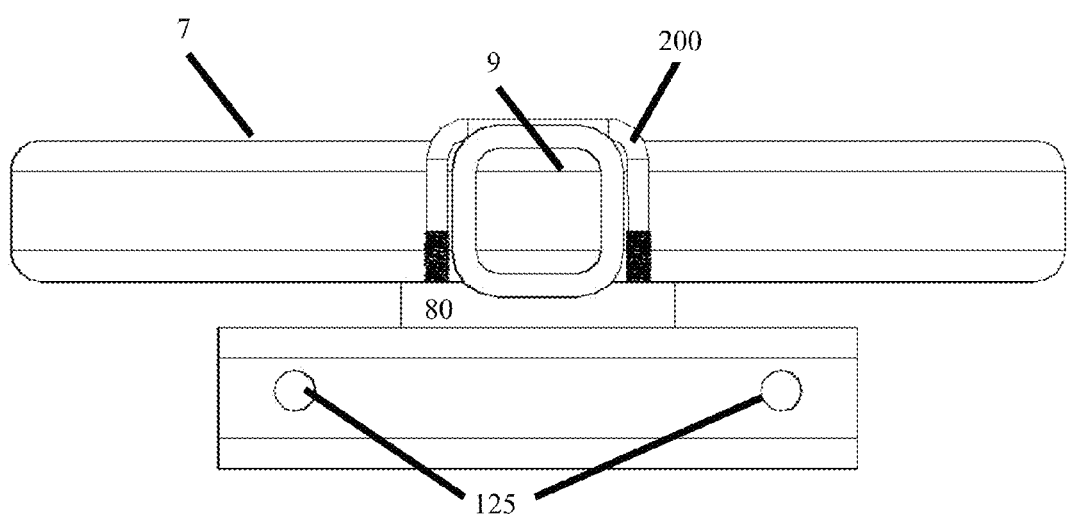
FIG. 15 is a front plant view of an embodiment of a dual configuration seating assembly, shown with a connector and attached to a receiver hitch neck.
Figure 16:
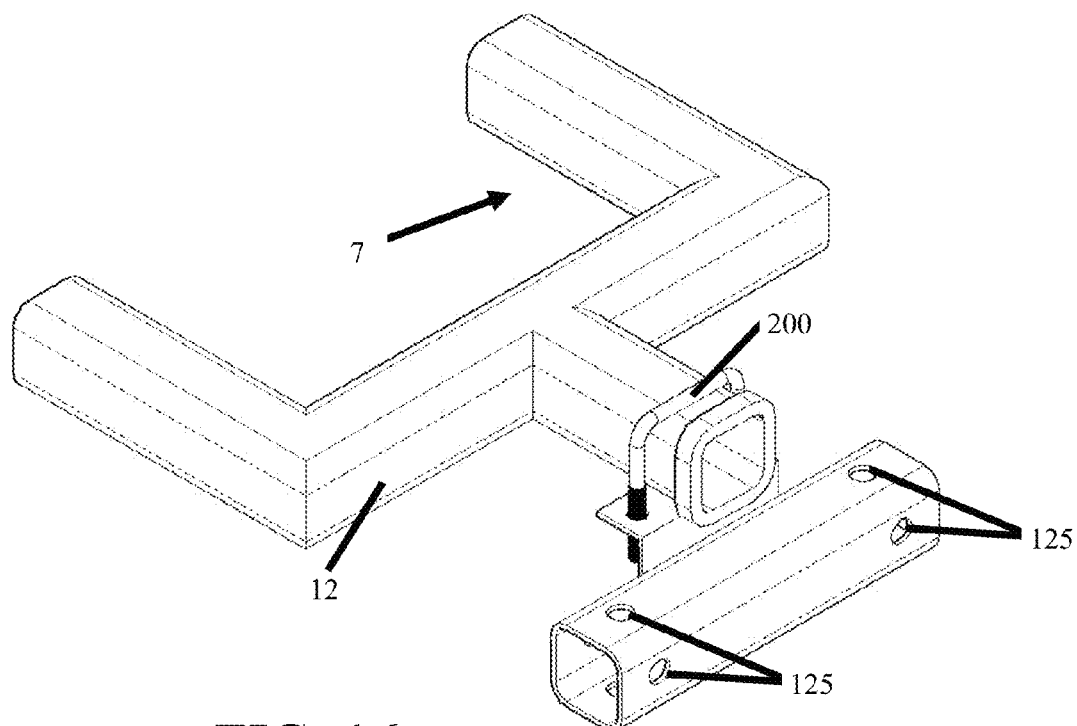
FIG. 16 is a front left isometric view of an embodiment of a dual configuration seating assembly, shown attached to a receiver hitch neck with the seating assembly facing towards the receiver hitch opening.
Figure 17:
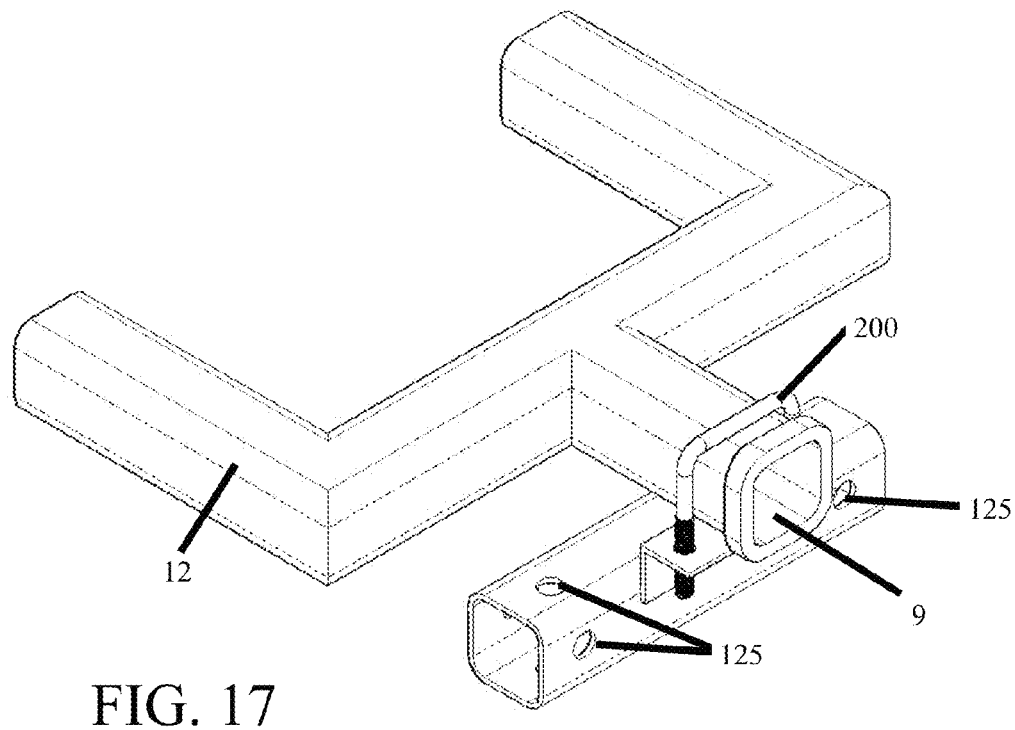
FIG. 17 is a front left isometric view of an embodiment of a dual configuration seating assembly, shown attached to a receiver hitch neck with the seating assembly facing away from the receiver hitch opening.

It has been mentioned above that a ball mount 5 has a shank 6 that fits into the receiver hitch opening 9. Receiver hitch openings are typically square or approximately square and, as such, the shank of a ball mount can also be square or approximately square. The square configuration of the components inhibits rotation of the ball mount and also aids in the alignment of shank holes for insertion of a connector pin 13 that holds the ball mount in the receiver hitch opening. FIG. 13 illustrates some examples of ball mounts that can be used with standard receiver hitch openings.

Figure 3A:
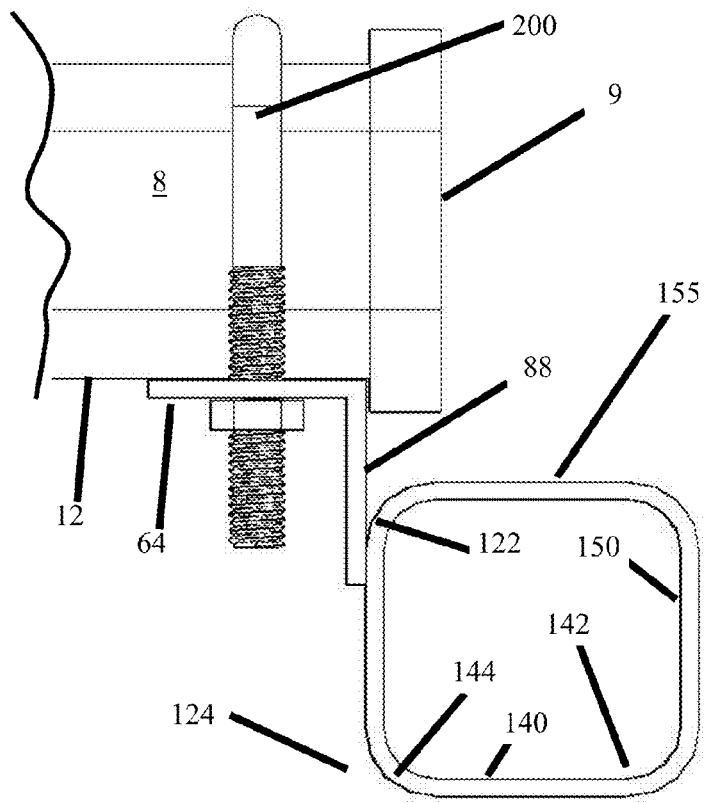
FIG. 3A is a left side plan view of the first embodiment in FIG. 1.
Figure 3B:
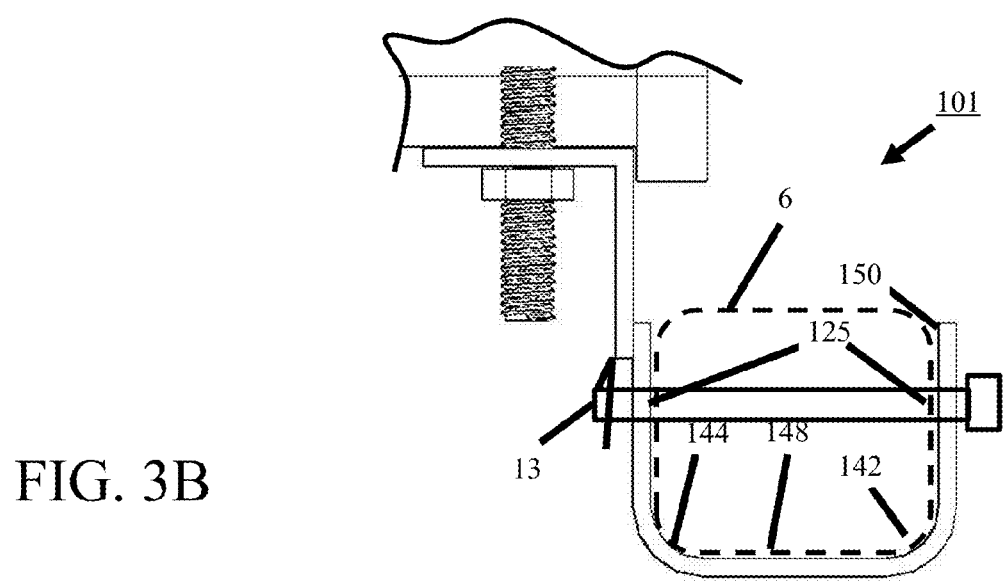
FIG. 3B is a left side plan view showing an alternative embodiment of an open seating assembly.
Figure 9:
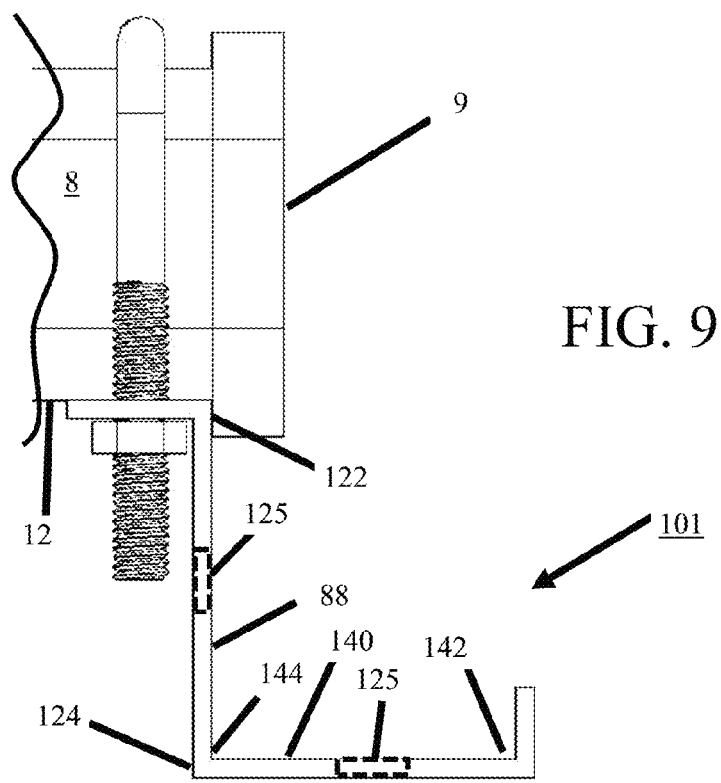
FIG. 9 is a left side plan view of the second embodiment in FIG. 7.

The main components of a seating assembly can be a seat wall 120, with a top edge 122 and a bottom edge 124, and a seat 140, with a front edge 142 and a rear edge 144. With this embodiment, the seat is attached at or about the distal end 3 of the seat wall. In a specific embodiment, the rear edge 144 of the seat is attached to the bottom edge 124 of the seat wall, as illustrated in FIGS. 3B and 9. In general, the seat wall and the seat can form a shelf-like structure that extends from the support plate. In use, the shank 6 can be situated in the seating assembly, in particular, placed parallel against the seat wall and the seat. Therefore, it can be beneficial for the seat wall and the seat to be situated at right angles to one another to accommodate the typical square shape of the shank. This is not required, but can provide the most support for the shank.

The seat wall 120 can further have at least one pin receiver eye 125. The pin receiver eye is an opening through the seat wall in which a ball mount pin can be inserted to secure a ball mount on the seating assembly. A ball mount inserted into a receiver hitch opening 9 is secured in the receiver hitch neck 6 with a pin that goes through the receiver hitch neck and the ball mount shank therein and is secured with a cotter pin or other clip that goes through the end of the pin after if emerges from the side of the receiver hitch neck, an example of which is shown in FIG. 3B. That same pin and clip 13 combination can be used to secure the ball mount shank to the seating assembly. A pin and clip 13 and use thereof is within the capability of one of ordinary skill in the art and will not be described in detail here.

The overall width of a seating assembly 100 and any of the components thereof, which is the distance between a first end 105 and a second end 110, can vary depending upon numerous factors understood by those with skill in the art. Preferably, the width of a seating assembly, or components thereof, is sufficient to support a ball mount and inhibit twisting, turning, rotating, wobbling, or other undesirable movement of the ball mount, particularly when the vehicle it is attached to is in motion. In one embodiment, the width of a seating assembly is between approximately 2 inches and approximately 10 inches. In a more particular embodiment, the width of a seating assembly is between approximately 3 inches and approximately 8 inches. In a specific embodiment, a seating assembly has a width of approximately 4 inches.

With regard to the depth of a seating assembly, which is the distance between a front edge 142 and a rear edge 144 of the seat 140, as with the width of the seating assembly, it should be sufficient to support a ball mount with minimal undesirable movement. Typically, the depth of a seat, in particular the seat face 148 that makes contact with the ball mount shank 6, is not required to be significantly greater than the typical width of a ball mount shank. As discussed above, ball mounts and their shanks are standardized in the industry to facilitate changing the size of the ball used with a particular receiver hitch. While there may be some variations in style and some acceptable tolerances with regard to the shank dimensions, they are for the most part interchangeable with multiple receiver hitches. Therefore, it would be within the skill of a person trained in the art to determine the most advantageous depth for a seat, to ensure that the ball mount is not only well-supported, but that the pin and clip on the ball mount can be used with the storage bracket as well.

There can also be more than one pin receiver eye 125 in a seating assembly. This provides the unique advantage of being able to place a ball mount in a seating assembly with the ball turned in one of several different directions. A ball mount typically has only two shank holes 4 that align with two holes in the receiver hitch neck for securing the ball mount in the receiver hitch opening. However, many ball mounts have elaborate extensions, multi-ball attachments, large step-down plates and other specialized designs, as shown, for example, in FIG. 13, that make it difficult or impossible to always place the ball shank in the same direction or configuration in a storage bracket as it would positioned in the receiver hitch. By having a plurality of pin receiver eyes 125 in the seating assembly, it allows the unique advantage of providing alternative placements for a ball mount within a storage bracket embodiment of the subject invention. Thus, there can be at least one pin receiver eye 125 in the seat 140 of a storage bracket, as shown, for example, in FIG. 9.

One embodiment of a seating assembly 100 has an open configuration 101 where there is at least one seat wall 120 and at least one seat 140. An open configuration is, in general, a seating assembly with at least one side or at least one partial side that is open, such that a ball mount can be emplaced by turning sideways and placing on the seat. One embodiment is substantially open at the front edge 142 to allow the shank to be presented sideways or parallel to the seat wall and seat when being placed in the seating assembly. A ball mount can be placed at either end 105 or 110 of the seat wall, as long as the shank holes 4 can be aligned with a pin receiver eye 125 in the seat wall 120 for receiving the ball mount pin 13.

In a further embodiment, there is at least one retaining fixture 150 on the seat that can provide additional support and inhibit undesirable movement of a ball mount when attached to the seating assembly. The retaining fixture can be attached at or about the front edge 150 and extend above the seat face 148, as shown for example, in FIG. 10. A retaining fixture can be any device at or near the front edge that acts as a barrier to inhibit movement of a ball mount in the seating assembly. This can include, but is not limited to, posts, pins, walls, nibs, wires, fencing or netting, or similar such devices. In one embodiment, a retaining fixture is a wall that extends perpendicular, or approximately perpendicular, to the seat face 148, which is also shown, by way of example, in FIG. 10. A retaining fixture can be the same or less than the width of the seat and there can be more than one retaining fixture. The height of one or more retaining fixtures can vary as well. FIG. 10 illustrates an embodiment where the retaining fixture is only tall enough above the seat face that it does not interfere with inserting a pin 13 through the shank hole 4 and the pin receiver eye 125 in the seat wall 120. For example, a retaining fixture can be about 0.5 inch to about 1.0 inch above the seat face.

In an alternative embodiment, a retaining fixture 150 can extend taller above the seat face. In a still further embodiment, a taller retaining fixture can also include another at least one pin receiver eye 125 aligned with a pin receiver eye in the seat wall 120, one example of which, is shown in FIG. 3B. Depending upon how tall the retainer fixture is relative to the support wall, a ball mount can still be presented into the seating assembly parallel with the width of the seat or the shank and can slide into the seating assembly from the first end 105 or the second end 110. This embodiment can provide further stability to a ball mount in the seating assembly, as the pin 13 can be supported in two places on the seating assembly. With this embodiment, the retaining fixture can extend at least tall enough above the seat face to accommodate another pin receiver eye.

Another embodiment of a seating assembly 100 has a closed configuration 102 where there is at least a seat wall 120, at least a seat 140, and at least a retaining fixture, all as described above, but which also includes at least one cover 155 that extends over the seat face. A closed configuration is, in general, a seating assembly with all sides at least partially closed such that a ball mount can only be emplaced on the seating assembly through one of the ends 105 or 110. FIGS. 1-6 illustrate embodiments of a closed configuration seating assembly. Similar to a retaining fixture 150, a cover 155 can be any device at the proximal end 2 of a retaining fixture that acts as a barrier over the seat 140 to inhibit movement of a ball mount in the seating assembly. A cover can include, but is not limited to, posts, pins, walls, nibs, wires, fencing or netting, or similar such devices that can block movement in the proximal direction of a ball mount. In one embodiment, a cover is a wall that extends parallel, or approximately parallel, to the seat face 148, which is shown, by way of example, in FIGS. 1, 3A, and 4B. A cover can be the same or less than the width of the seat, and there can be more than one cover. The depth of one or more retaining fixtures can vary as well. FIGS. 1, 3A, and 4B illustrate embodiments where the cover is attached to both the retaining fixture and the seat wall. In an alternative embodiment, a cover is attached to only one of these components.

Typically, the use of a cover inhibits the placement of a ball mount into the storage bracket by presentation of the storage bracket parallel with the seat, as can be done with an open configuration 101 seating assembly. With a closed configuration 102, the shank of a ball mount can be pushed through the first end 105 and/or the second end 110 of the seating assembly until the shank holes are aligned with one or more pin receiver eyes on the seating assembly. A closed configuration seating assembly can provide additional support for a ball mount.

In a closed configuration, the cover 155 does not have to extend entirely over a seat. In one embodiment, the cover can extend over the seat sufficiently, from either the seat wall 120 or the retaining fixture 150, to inhibit movement or removal of a ball mount from a seating assembly, except through an end 105 or 110. FIG. 3B illustrates an example of a cover that extends only partially over a seat. In an alternative embodiment, the cover can extend far enough over a seat that another pin receiver eye can be included in the cover. The benefits of having multiple pin receiver eyes 125 in a storage bracket of the subject invention have been discussed above.

In a specific embodiment, there can be at least one pin receiver eye in the cover 155 that aligns with at least one pin receiver eye in the seat, an example of which is shown in FIG. 4B. This can allow a ball mount to be rotated so that the shank holes are vertically aligned with each other and with the pin receiver eyes in the cover and the seat. The pin of the ball mount can then be positioned through both pin receiver eyes and both shank holes to secure the ball mount sideways in the seating assembly 100.

There are different sizes of balls that can be attached to a ball mount for different towing purposes. While the balls are usually threaded for interchangeability on a mount, it is usually more expedient to have ball mounts with a dedicated ball thereon. When necessary, the ball mount can be swapped in the receiver hitch. This necessitates having to store more than one ball mount. The storage bracket embodiments of the subject invention can, with minimal modification, accommodate dual ball mounts.

Another alternative embodiment of a seating assembly 100 has a dual configuration 103 where a storage bracket has at least a seat 140 that is wide enough, between the first end 105 and the second end 110, that a ball mount can be placed at either end. Other components of a seating assembly, described above, can be adjusted accordingly to properly secure one ball mount at either end or to secure two ball mounts, one at each end. By way of example, one or more of the hanging assembly 50 components can be widened. By way of further example, one or more components of the seating assembly 100, other than just the seat, can be widened. Thus, any one or more components of a storage bracket can be made wider than or as wide as the seat required for a dual configuration embodiment. It will also be understood by a person with skill in the art that, given the disclosure of the subject application, any of the embodiments described above, for an open configuration 101 or a closed configuration 102 storage bracket, can be modified or widened for a dual configuration embodiment.

FIGS. 14-17 illustrate non-limiting examples of a storage bracket 10 having a dual configuration 103 seating assembly 100, wherein only the components of the seating assembly have been widened to the same width as the width of the seat. The ability to widen or deepen these or other components of a storage bracket to accommodate two ball mounts is within the capability of one of ordinary skill in the art and will not be described in further detail here. Such variations for dual configurations that provide the same features and benefits, in substantially the same way as described above for the open and closed configuration embodiments are within the scope of this invention.

One particular embodiment includes additional pin receiver eyes 125 strategically positioned within one or more components of a storage bracket that permit securing a ball mount at either end. In a further embodiment the additional pin receiver eyes not only permit securing a ball mount at either end, but also allow each one to be in the same or turned in a different direction. FIGS. 14-17 illustrate examples of dual configuration embodiments with at least four pin receiver eyes at each end to accommodate the shank eyes 4 of a ball mount turned in any direction.

An open configuration to a seating assembly can be advantageous on vehicles where objects or structures on either side of the receiver hitch can inhibit sliding the ball mount into the seating assembly from one of the ends 105 or 110. A closed configuration to a seating assembly can provide more stability and security to a ball mount. A closed configuration can also significantly reduce undesirable movement of the ball mount in the seating assembly, especially if the tolerances or minimized so as to create a snug fit with a ball mount. A dual configuration 103 can allow more than one ball mount to be stored on a vehicle, which provides greater flexibility in towing. The decision about which seating assembly to utilize can depend upon the configuration of the vehicle, the type or style of ball mount, driving conditions (road vs. off-road use), and other factors understood by a person skilled in the art.

The examples and embodiments described herein are for illustrative purposes only and that various modifications or changes in light thereof will be suggested to persons skilled in the art and are to be included within the spirit and purview of this application.

The invention has been described herein in considerable detail, in order to comply with the Patent Statutes and to provide those skilled in the art with information needed to apply the novel principles, and to construct and use such specialized components as are required. However, the invention can be carried out by specifically different equipment and devices, and that various modifications, both as to equipment details and operating procedures can be effected without departing from the scope of the invention itself. Further, although the present invention has been described with reference to specific details of certain embodiments thereof and by examples disclosed herein, it is not intended that such details should be regarded as limitations upon the scope of the invention except as and to the extent that they are included in the accompanying claims.

I claim:

1. A ball mount storage bracket adapted to be adjustably attached to a trailer hitch receiver, the storage bracket comprising:
   a hanger assembly comprising:
      a stabilizer plate having at least two lateral edges, an under-surface, a stabilizing surface, and a fixation structure;
      a supporting plate having an upper edge, a lower edge, and a facing surface, where the stabilizer plate is attached at or about the upper edge;
   a seating assembly comprising:
      a seat wall, with a top edge, attached to or contiguous with the supporting plate;
      at least one pin receiver eye through the seat wall; and
      a seat with a seat face and two ends, where the seat is attached at or about the lower edge of the seat wall,
   such that, when the ball mount storage bracket is attached to a trailer hitch receiver, the stabilizer plate is in contact with the trailer hitch receiver.

2. The ball mount storage bracket, according to claim 1, wherein the top edge of the seat wall is attached to the supporting plate.

3. The ball mount storage bracket, according to claim 1, wherein the top edge of the seat wall is attached to the lower edge of the supporting plate.

4. The ball mount storage bracket, according to claim 1, wherein the seating assembly is a closed configuration.

5. The ball mount storage bracket, according to claim 4, wherein the seating assembly further comprises at least one pin receiver hole in at least one location other than the seat wall.

6. The ball mount storage bracket, according to claim 5, wherein the at least one other pin receiver hole is in a retaining fixture on the seating assembly.

7. The ball mount storage bracket, according to claim 1, wherein the seating assembly has a dual configuration, such that there are at least two pin receiver holes in the seat wall.

8. The ball mount storage bracket, according to claim 7, wherein the seating assembly further comprises at least one additional pin receiver hole in at least one location other than the seat wall.

9. The ball mount storage bracket, according to claim 8, wherein the at least one additional pin receiver hole is in a retaining fixture on the seating assembly.

10. A method for securing a ball mount to a trailer hitch receiver, the method comprising:
    securing a ball mount storage bracket, according to claim 1, to a trailer hitch receiver neck, such that the trailer hitch receiver neck is in contact with the stabilizer plate;
    placing a shank of the ball mount, with shank holes therein, so that the shank holes align with the at least one pin receiver eye on the seating assembly; and
    inserting a pin through the aligned shank holes and the at least one pin receiver eye.

11. The method, according to claim 10, wherein the pin is a hitch pin.

12. The method, according to claim 10, wherein the seating assembly is an open configuration.

13. The method, according to claim 12, further comprising a retaining fixture on the seat.

14. The method, according to claim 13, further comprising at least one pin receiver hole in the retaining fixture, wherein the method further comprises aligning the shank holes in the ball mount shank with the at least one pin receiver hole in the seat wall and the at least one pin receiver hole in the retaining fixture.

15. The method, according to claim 10, wherein the seating assembly has a closed configuration and the method further comprises pushing the ball mount shank through the seating assembly so that the shank holes align with the at least one pin receiver hole.

16. The method, according to claim 15, wherein the seating assembly further comprises at least one pin receiver hole in at least one location other than the seat wall and the method further comprises pushing the ball mount shank into the seating assembly with the shank holes aligned with the pin receiver holes in the other locations.

17. The method, according to claim 16, wherein the at least one other pin receiver hole is in a retaining fixture on the seating assembly.

18. The method, according to claim 10, wherein the ball mount storage bracket further comprises a connector that engages with the at least one fixation structure and the method further comprises:
    positioning the trailer hitch receiver neck between the connector and the stabilizer plate; and
    tightening the connector so as to bring the stabilizer plate into contact with the trailer hitch receiver neck.

19. The method, according to claim 18, wherein the fixation structure on the storage bracket is at least one connector hole.

20. The method, according to claim 19, wherein the connector is a U-bolt comprising two threaded ends and wherein the method comprises tightening a nut onto each of the threaded ends to bring the stabilizer plate into contact with the trailer hitch receiver hitch neck.

21. The ball mount storage bracket, according to claim 1, further comprising a connector that engages with the at least one fixation structure.

22. The ball mount storage bracket, according to claim 21, wherein the trailer hitch receiver is disposed between the connector and the stabilizer plate.

23. The ball mount storage bracket, according to claim 22, wherein the fixation structure is at least one connector hole.

24. The ball mount storage bracket, according to claim 23, wherein the connector is a U-bolt that engages with the at least one connector hole.

* * * * *